United States Patent [19]

Inamoto et al.

[11] Patent Number: 4,609,427

[45] Date of Patent: Sep. 2, 1986

[54] METHOD FOR PRODUCING INK JET RECORDING HEAD

[75] Inventors: Tadayoshi Inamoto, Machida; Masami Yokota, Hiratsuka; Hiroshi Sugitani, Machida, all of Japan

[73] Assignee: Canon Kabushiki Kaisha, Tokyo, Japan

[21] Appl. No.: 634,439

[22] Filed: Jul. 26, 1984

Related U.S. Application Data

[63] Continuation-in-part of Ser. No. 507,579, Jun. 24, 1983, abandoned.

[30] Foreign Application Priority Data

| | | | |
|---|---|---|---|
| Jun. 25, 1982 | [JP] | Japan | 57-109446 |
| Jun. 29, 1982 | [JP] | Japan | 57-110666 |
| Jun. 29, 1982 | [JP] | Japan | 57-110667 |
| Jun. 29, 1982 | [JP] | Japan | 57-110668 |
| Jul. 28, 1983 | [JP] | Japan | 58-138555 |

[51] Int. Cl.$^4$ ........................ B44C 1/22; C03C 15/00; C03C 25/06; B29C 17/08

[52] U.S. Cl. .................................... 156/633; 156/643; 156/644; 156/652; 156/655; 156/668; 156/659.1; 346/1.1; 346/140 R; 430/313

[58] Field of Search ............... 156/633, 643, 644, 652, 156/655, 668, 299, 300, 252, 253, 659.1; 346/1.1, 140 R; 430/313

[56] References Cited

U.S. PATENT DOCUMENTS

| | | | |
|---|---|---|---|
| 3,962,004 | 6/1976 | Sonneborn | 156/11 |
| 4,296,421 | 10/1981 | Hara et al. | 346/140 R |
| 4,302,361 | 11/1981 | Kotani et al. | 252/503 |
| 4,332,881 | 6/1982 | Shankoff | 430/311 |
| 4,412,224 | 10/1983 | Sugitani | 346/1.1 |
| 4,437,100 | 3/1984 | Sugitani et al. | 346/1.1 |
| 4,468,282 | 8/1984 | Neukermans | 156/633 |

*Primary Examiner*—William A. Powell

*Attorney, Agent, or Firm*—Fitzpatrick, Cella, Harper & Scinto

[57] ABSTRACT

A method for producing an ink jet head by providing ink pathways formed from a photosensitive resin on a substrate surface and laminating a covering over said pathways comprises providing a protective layer comprising an inorganic oxide and/or an inorganic nitride on said substrate having arranged an ink discharging pressure generating element thereon, treating the surface of the protective layer with a silane coupler or at least one organometallic compound selected from the group consisting of metal alcoholates, metal carboxylates and metal chelate compounds, and thereafter laminating the aforesaid photosensitive resin.

28 Claims, 9 Drawing Figures

METHOD FOR PRODUCING INK JET RECORDING HEAD

This application is a continuation-in-part of application Ser. No. 507,579, filed June 24, 1983, now abandoned.

BACKGROUND OF THE INVENTION

1. Field of the Invention

This invention relates to a method for producing an ink jet recording head, particularly to a method for producing an ink jet recording head for generation of small droplets of ink to be used for an ink jet recording system.

2. Description of the Prior Art

Ink jet recording heads to be applied for ink jet recording systems are generally provided with minute ink discharging outlets (orifices), ink pathways and an ink discharging energy acting portion provided at a part of the ink pathways as the portion where the energy for discharging ink through the above discharging outlets acts on the ink existing in the ink pathways (energy acting portion).

In the prior art, as the method for preparing such ink jet recording heads, there is known, for example, the method in which minute grooves are formed on a plate of glass or metal by cutting or etching and then the plate having formed grooves is bonded with an appropriate plate to form ink pathways.

However, in the head prepared by such a method of the prior art, the internal walls of the ink pathways may be too coarse when formed by cutting or may be distorted due to the difference in etching degree, whereby ink pathways with good precision are hard to obtain and the ink jet recording heads after preparation are liable to give ink discharging characteristics which are scattered. Also, during cutting work, chipping or cracking of the plate is liable to occur to give a disadvantageously poor yield of product. And, when etching working is applied, it involves a large number of production steps which brings about a disadvantageous increase in cost. Another drawback common in these preparation methods of the prior art is that, during lamination of an engraved plate having formed ink pathway grooves and a lid plate having formed thereon of driving elements, such as piezoelectric elements or heat generating elements for generating energies acting on ink, it is difficult to effect registration therebetween with good precision, thus failing to afford bulk production.

As the method for producing ink jet recording heads which can overcome these drawbacks, there has been proposed a method for production of ink jet heads in which ink pathway walls comprising a cured film of a photosensitive resin are formed, as disclosed in Japanese Laid-open Patent Application No. 43876/1982. According to this method, ink-flow pathways can be minutely worked precisely and with a good yield. In addition, since this method provides for bulk production to provide ink jet heads at low cost, it can be said to be an excellent method.

However, although the ink jet head provided by such an improved method overcomes the drawbacks in the ink jet recording head of the prior art, the adhesive force between the substrate and the hardened photosensitive resin film is lowered during prolonged immersion in an ink, thereby forming minute peel-offs which have an influence on the characteristics of the ink, namely the precision of shot spots of the ink. This has been a great obstacle in recent years where the ink jet recording system is required to give an image quality of high resolution by means of a high density nozzle.

SUMMARY OF THE INVENTION

The present invention has been accomplished in view of the above drawbacks and, an object of the present invention is to provide a novel method for producing an ink recording head which is precise and also high in reliability.

It is also another object of the present invention to provide a method for producing at a good yield by a simple procedure an ink jet head having ink pathways minutely worked faithfully to the design with good precision.

Further, it is still another object of the present invention to provide an ink jet head which is excellent in durability during use.

As employed herein the phrase "silane coupling agent" includes silane coupling compounds as defined herein, including those containing amine substituents. As employed herein the phrase "silane coupling reactant" includes silane coupling compounds defined herein excluding those containing amine substituents. As employed herein the phrase "a compound having an amino group" covers, inter alia, aliphatic amines and only those silane coupling compounds having amine substituents.

The present invention having accomplished the various objects as mentioned above is a method for producing an ink jet head by providing ink pathways formed from a photosensitive resin on a substrate surface and laminating a covering over said pathways, which comprises providing a protective layer comprising an inorganic oxide and/or an inorganic nitride on said substrate having arranged an ink discharging pressure generating element thereon, treating the surface of the protective layer with a silane coupling agent or at least one organometallic compound selected from the group consisting of metal alcoholates, metal carboxylates and metal chelate compounds, and thereafter laminating the aforesaid photosensitive resin. Alternatively, it also provides a method for producing an ink jet head by providing ink pathways formed from a photosensitive resin on a substrate surface and laminating a covering over said pathways, which comprises providing a protective layer comprising a metal on said substrate having arranged an ink discharging pressure generating device thereon, treating the surface of the protective layer with a silane coupling agent or at least one organometallic compound selected from the group consisting of metal alcoholates, metal carboxylates and metal chelate compounds, and thereafter laminating the aforesaid photosensitive resin.

Still another object of the present invention is to provide a method for producing an ink jet head, which comprises treating the surface of a substrate having an ink discharging energy generating element provided thereon with a silane coupling reactant in combination with a compound having an amino group, subsequently forming ink pathway walls comprising a hardened film of a photosensitive resin hardened to a desired pattern, and then providing a cover thereon.

In another embodiment the invention includes a method for producing an ink jet head by providing ink pathways formed from a photosensitive resin on a substrate surface and laminating a covering over said pathways, which comprises providing a protective layer comprising an inorganic oxide and/or an inorganic nitride on said substrate having arranged an ink discharging pressure generating element thereon, treating the surface of the protective layer with (a) a silane coupler selected from the group consisting of (1) a silane coupling agent or (2) a silane coupling reactant combined with a compound having an amino group; or (b) at least one organometallic compound selected from the group consisting of metal alcoholates, metal carboxylates and metal chelate compounds, and thereafter laminating the aforesaid photosensitive resin.

Alternatively, it also provides a method for producing an ink jet head by providing ink pathways formed from a photosensitive resin on a substrate surface and laminating a covering over said pathways, which comprises providing a protective layer comprising a metal on said substrate having arranged an ink discharging pressure generating device thereon, treating the surface of the protective layer with (a) a silane coupler selected from the group consisting of (1) a silane coupling agent or (2) a silane coupling reactant combined with a compound having an amino group; or (b) at least one organometallic compound selected from the group consisting of metal alcoholates, metal carboxylates and metal chelate compounds, and thereafter laminating the aforesaid photosensitive resin.

DESCRIPTION OF THE PREFERRED EMBODIMENTS

Figure 1:
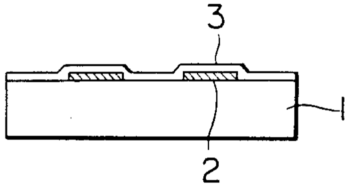
FIGS. 1 through 6 are schematic drawings illustrating the preparation steps of the ink jet head of the present invention.

Referring now to the drawings, the present invention is to be described in detail.

FIGS. 1 through 6 are schematic drawings illustrating the procedure for preparation of the ink jet head of the present invention.

In the step shown in FIG. 1, ink discharging energy (pressure) generating elements 2 such as heat generating elements or piezo elements are arranged in a desired number on a substrate 1, such as one formed of glass, ceramic, plastic or metal, and for the purpose of imparting electrical insulation, there is provided a coating of a protective layer 3 comprising an inorganic oxide and/or an inorganic nitride such as $SiO_2$, $Ta_2O_5$, $Al_2O_3$, glass, $Si_3N_4$, BN, etc. These inorganic oxides or inorganic nitrides are materials which can exhibit the effect of the treatment with (i) a silane coupling agent; (ii) a silane coupling reactant combined with a compound having an amino group, or (iii) at least one organometallic compound selected from the group consisting of metal alcoholates, metal carboxylates and metal chelate compounds, which treatment is conducted for the purpose of improvement of adhesive force with the hardened photosensitive resin film. To the ink discharging pressure generating elements 2 are connected electrodes for input of signals, although not shown in the drawing.

For the purpose of imparting primarily ink resistance, a protective layer comprising a metal is coated on the substrate 1 after or without application of the aforesaid layer in an inorganic oxide and/or an inorganic nitride. As the metal for formation of the protective layer 3 for improvement of ink resistance, there may be employed anti-corrosive metals such as Ti, Cr, Ni, Ta, Mo, W, Nb, etc. or anti-corrosive alloys such as stainless steel, Monel metals, etc. Noble metals such as Au, Pd, Pt, etc. may be good in ink resistance, but insufficient in matching performance relative to the silane coupler or the organometallic compounds as hereinafter described and therefore not preferable.

Figure 2:
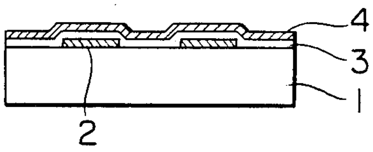

As the next step, in a first embodiment the surface of the substrate 1 having the coated layer 3 obtained in the step shown in FIG. 1 is cleaned, dried at 80° C. to 150° C. for 10 minutes and thereafter applied with spinner coating with a 1% solution of gamma mercaptopropyl trimethoxysilane having a molecular structure of $HS(CH_2)_3Si(OCH_3)_3$ in ethyl alcohol or a 1% solution of isopropyl triisostearoyl titanate (trade name: TTS, produced by Ajinomoto K.K.; molecular structure:

$$CH_3-\overset{\overset{\displaystyle CH_3}{|}}{C}H-O-Ti[O-\overset{\overset{\displaystyle O}{\|}}{C}_{17}-H_{35}]_3)$$

in toluene at 1000 to 6000 rpm, followed by heating at 80° C. for 10 minutes to promote the reaction between the substrate 1 and the silane coupling agent or the organometallic compound, thereby forming a layer 4 with a thickness of 0.3 u or less laminated on the substrate to provide the substrate as shown in FIG. 2.

In a second embodiment the surface of the substrate 1 obtained in the step shown in FIG. 1 is cleaned, dried at 80° C. to 150° C. for 10 minutes at thereafter applied with spinner coating with a mixed solution of n-propylamine having a molecular structure of $CH_3CH_2CH_2NH_2$ and gamma mercaptopropyl trimethhoxysilane having a molecular structure of $HS(CH_3)_3Si(OCH)_3)_3$ in ethyl alcohol (each at a concentration of 0.05 mol/liter) followed by heating at 80° C. for 10 minutes to promote the reaction between the substrate 1 and the silane coupling reactant, thereby forming a coupling agent layer 4 with a thickness of 0.3 micron or less laminated on the substrate to provide the substrate as shown in FIG. 2.

In the method according to the first embodiment, it is possible to employ all the silane coupling agents generally known in the art. Typical examples of such agents are classified according to the functional groups as set forth in Table 1. Among the silane coupling agents, it is preferred to use a silane coupling agent having functional groups reactive with the photosensitive resin side, based on the composition of the photosensitive resin employed.

As the organometallic compound, other than isopropyl triisostearoyl titanate, it is also possible to use at least one organometallic compound selected from the group consisting of metal alcoholates, metal carboxylates and metal chelate compounds. As the metal constituting these organometallic compounds, aluminum, zirconium, cobalt and titanium are preferred. Although other metals can exhibit some effects, there are involved problems with respect to cost or toxicity.

Metal alcoholates may include ethylates, propylates and butyrates, of which metal alcoholates readily available for commercial use are aluminum isopropylate, titanium isopropylate, zirconium tert-butylate, etc. As the chelate compounds, there may be included those which can be obtained by allowing these metal alcoholates to react with chelating agents such as acetyl acetone, 3-ethyl acetylactone, 3-phenyl acetylacetone, 3-methoxy acetylacetone, dibenzoyl acetylacetone, methoxycarboniumacetone and the like.

The organometallic compound may preferably be chosen from organometallic compounds having functional groups reactive with the photosensitive resin depending on the composition of the photosensitive resin employed. Typical examples of these organometallic compounds are enumerated in Tables 1-2 to 1-5.

In the second embodiment the substrate surface is treated with a silane coupling reaction in combination with a compound having an amino group. The silane coupling reactant is as set forth in Table 1-6.

As the compound having an amino group, there may be included aliphatic amines as preferable ones. Among them, the particularly preferred are n-propylamine, diethylamine, ethylenediamine, and triethylamine.

Further, it is also possible to use a silane coupling compounds having an amino group selected from those as enumerated below in Table 2.

TABLE 1-1

| Functional group | Chemical name | Structural formula |
|---|---|---|
| Vinyl | Vinyl trichlorosilane | $CH_2{=}CHSiCl_3$ |
| | Vinyl trimethoxysilane | $CH_2{=}CHSi(OCH_3)_3$ |
| | Vinyl triethoxysilane | $CH_2{=}CHSi(OC_2H_5)_3$ |
| | Vinyl triacetoxysilane | $CH_2{=}CHSi(O\overset{\overset{O}{\|}}{C}CH_3)_3$ |
| | Vinyl tris(β-methoxyethoxy)silane | $CH_2{=}CHSi(OCH_2CH_2OCH_3)_3$ |
| | N—β-(N—vinylbenzylaminoethyl)-γ-aminopropyl trimethoxysilane | 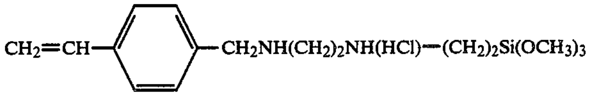 |
| Acryl | γ-methacryloxypropyl trimethoxysilane | $CH_2{=}\overset{\overset{CH_3}{\|}}{C}{-}\overset{\overset{O}{\|}}{C}{-}O(CH_2)_2Si(OCH_3)_3$ |
| | γ-mèthacryloxypropyl tris(β-methoxyethoxy)-silane | $CH_2{=}\overset{\overset{CH_3}{\|}}{C}{-}\overset{\overset{O}{\|}}{C}{-}O(CH_2)_2Si(OCH_2CH_2OCH_3)_3$ |
| | | $[CH_2{=}\overset{\overset{H_3C}{\|}}{C}{-}\overset{\overset{O}{\|}}{C}{-}O(CH_2)_2\overset{\overset{(CH_3)_2}{\|}}{N}{-}(CH_2)_2Si{-}(OCH)_x{-}(O\underset{\underset{(CH_3)_2}{\|}}{C}{-}CH_2\underset{\underset{O}{\|}}{C}CH_2)_{1-x}]^+Cl^-$ |
| Epoxy | β-(3,4-epoxycyclohexyl)-ethyl trimethoxysilane | 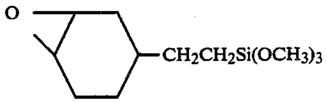 |
| | γ-glycidoxypropyl trimethoxysilane | 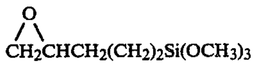 |
| Mercapto | γ-mercaptopropyl trimethoxysilane | $HSCH_2CH_2CH_2Si(OCH_3)_3$ |
| | γ-mercaptopropylmethyl dimethoxysilane | $HSCH_2CH_2CH_2\overset{\overset{CH_3}{\|}}{Si}(OCH_3)_2$ |
| Amine | γ-aminopropyl trimethoxysilane | $NH_2CH_2CH_2CH_2Si(OCH_3)_3$ |
| | γ-aminopropyl triethoxysilane | $NH_2CH_2CH_2CH_2Si(OC_2H_5)_3$ |
| | N—β(aminoethyl)γ-aminopropyl trimethoxysilane | $NH_2(CH_2)_2NH(CH_2)_3Si(OCH_3)_3$ |
| | N—β(aminoethyl)γ-aminopropylmethyl dimethoxysilane | $NH_2(CH_2)_2NH(CH_2)_3\overset{\overset{CH_3}{\|}}{Si}(OCH_3)_2$ |
| | N—(dimethoxymethylsilylisobutyl)ethyleneamine | $NH_2(CH_2)_2NHCH_2CH(CH_2)CH_2{-}Si(OCH_3)_2CH_3$ |
| | γ-[bis(β-hydroxyethyl)]-aminopropyl triethoxysilane | $(HOCH_2CH_2)_2N(CH_2)_2Si(OC_2H_5)_3$ |
| | γ-ureidopropyl triethoxysilane | $NHCONH(CH_2)_3Si(OC_2H_5)_3$ |

TABLE 1-1-continued

| Functional group | Chemical name | Structural formula |
|---|---|---|
| | γ-anilinopropyl trimethoxysilane | 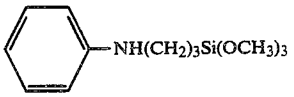 |
| | | 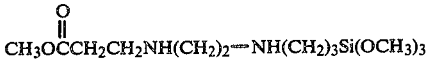 |
| | | 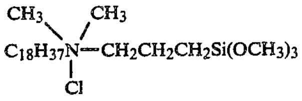 |
| | | $H\text{-(}NHRNHR'CO\text{)}_x\text{-(}NHRNR'CO\text{)}_y NHRNH_2R''\text{—}Si(OR)_3$ |
| Methyl | Methyl trichlorosilane | $CH_3SiCl_3$ |
| | Dimethyl dichlorosilane | $(CH_3)_2SiCl_2$ |
| | Trimethyl chlorosilane | $(CH_3)_3SiCl$ |
| | Methyl trimethoxysilane | $CH_3Si(OCH_3)_3$ |
| | Methyl triethoxysilane | $CH_3Si(OC_2H_5)_3$ |
| | Hexamethylene disilasane | $(CH_3)_3SiNHSi(CH_3)_3$ |
| Chloro | γ-chloropropyl trimethoxysilane | $ClCH_2CH_2CH_2Si(OCH_3)_3$ |
| | γ-chloropropylmethyl dimethoxysilane |  |
| Phenyl | Phenyl trimethoxysilane | 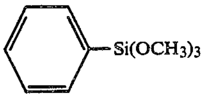 |
| | Phenyl triethoxysilane | 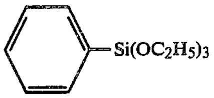 |

TABLE 1-2

| | Titanium |
|---|---|
| Chemical name | Structural formula |
| Tetraisopropyl titanate | $Ti[OCH(CH_2)_2]_4$ |
| Tetra-n-butyl titanate | $Ti[OC_4H_9]_4$ |
| Tetra(2-ethylhexyl)-titanate | $Ti[OCH_2CH(C_2H_5)C_4H_9]_4$ |
| Tetrastearyl titanate | $Ti(OC_{17}H_{35})_4$ |
| Diisopropoxy-bis(acetyl-acetonato)titanium | $Ti[OCH(CH_2)_2]_2[OC(CH_2)CHCOCH_3]_2$ |
| Di-n-butyoxy-bis(tri-ethanolaminato)titanium | $Ti(OC_4H_9)_2[OC_2H_4N(C_2H_5OH)_2]_2$ |
| Dihydroxy-bis(lactato) titanium | $Ti(OH)_2[OCH(CH_3)COOH]_2$ |
| Isopropoxytitanium triisostearate | $Ti[OCH(CH_3)_2](OCOC_{17}H_{35})_3$ |
| Titanium isopropoxy-octyleneglycolate | |
| Titanium n-butoxy-octyleneglycolate | |
| Titanium lactate ethyl ester | $Ti(OC_2H_5)(C_5H_9O_3)_2$ |
| Titanium triethanolaminate | $Ti(C_6H_{15}O_3N)_2$ |
| Isopropyltridodecyl-benzene sulphonyltitanate | 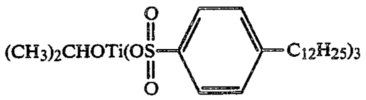 |
| Isopropyl tris(dioctyl-pyrophosphate)titanate | 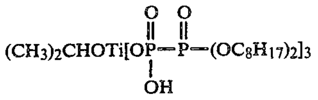 |
| Tetraisopropyl-bis(dioctyl- | $[(CH_3)_2CHO]_3Ti[P(OC_8H_{17})_2OH]_2$ |

TABLE 1-2-continued

| Chemical name | Titanium<br>Structural formula |
|---|---|
| phosphite)titanate | |
| Tetraoctyl bis(ditridecyl-phosphite)titanate | $(C_8H_{17}O)_4Ti[P(OC_{12}H_{25})_2OH]_2$ |
| Tetra(2,2-diallyloxymethyl-1-butyl)bis(ditridecyl)-phosphite titanate | 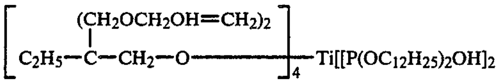 |
| Bis(dioctylpyrophosphate)-oxyacetate titanate | 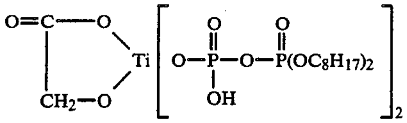 |
| Bis(dioctylpyrophosphate)-ethylene titanate | 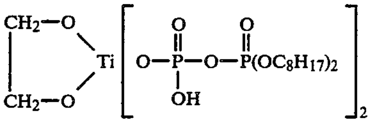 |

TABLE 1-3

| Chemical name | Aluminum<br>Structural formula |
|---|---|
| Aluminum triethyl alkoxide | $(C_2H_5O)_3Al$ |
| Aluminum triisopropyl alkoxide | $[(CH_3)_2CHO]_3Al$ |
| Aluminum tri-n-butyl alkoxide | $[C_4H_9O]_3Al$ |
| Tri(acetylacetone)aluminum | $Al[OC(CH_3)CHCOCH_3]_3$ |

TABLE 1-4

| Chemical name | Zirconium<br>Structural formula |
|---|---|
| Tetraethyl zirconate | $Zr(OC_2H_5)_4$ |
| Tetraisopropyl zirconate | $Zr[OCH(CH_3)_2]_4$ |
| Tetra-n-butyl zirconate | $Zr(OC_4H_9)_4$ |
| Tetra-n-pentyl zirconate | $Zr(OC_5H_{11})_4$ |
| Tetra-n-heptyl zirconate | $Zr(OC_7H_5)_4$ |

TABLE 1-4-continued

| Chemical name | Zirconium<br>Structural formula |
|---|---|
| Tetra-n-octyl zirconate | $Zr(OC_8H_{17})_4$ |
| Zirconyl tetraacetate | $Zr(OCOCH_3)_4$ |
| Zirconyl tetrastearate | $Zr(OCOC_{17}H_{35})_4$ |
| Tetra(acetylacetone)zirconium | $Zr[OC(CH_3)CHCOCH_3]_4$ |

TABLE 1-5

| Chemical name | Cobalt<br>Structural formula |
|---|---|
| Cobalt triisopropyl alkoxide | $[(CH_3)_2CHO]_3Co$ |
| Cobalt tri-n-butyl alkoxide | $(C_4H_9O)_3Co$ |
| Di(acetylacetone)cobalt | $Co[OC(CH_3)CHCOCH_3]_2$ |
| Tri(acetylacetone)cobalt | $Co[OC(CH_3)CHCOCH_3]_3$ |

TABLE 1-6

| Functional group | Chemical name | Structural formula |
|---|---|---|
| Vinyl | Vinyl trichlorosilane | $CH_2{=}CHSiCl_3$ |
| | Vinyl trimethoxysilane | $CH_2{=}CHSi(OCH_3)_3$ |
| | Vinyl triethoxysilane | $CH_2{=}CHSi(OC_2H_5)_3$ |
| | Vinyl triacetoxysilane |  |
| | Vinyl tris(β-methoxy-ethoxy)silane | $CH_2{=}CHSi(OCH_2CH_2OCH_3)_3$ |
| | N—β-(N—vinylbenzylamino-ethyl)-γ-aminopropyl trimethoxysilane | 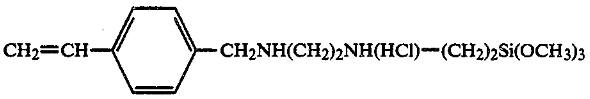 |
| Acryl | γ-methacryloxypropyl trimethoxysilane | 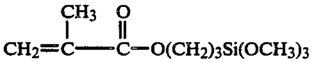 |
| | γ-methacryloxypropyl tris(β-methoxyethoxy)-silane | 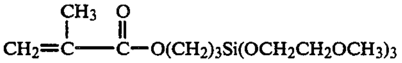 |
| | | 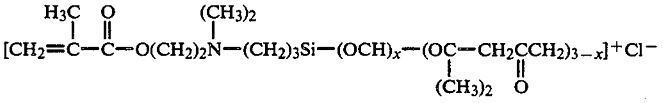 |

TABLE 1-6-continued

| Functional group | Chemical name | Structural formula |
|---|---|---|
| Epoxy | β-(3,4-epoxycyclohexyl)-ethyl trimethoxysilane | 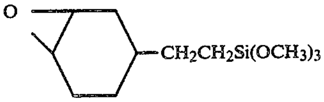 |
| | γ-glycidoxypropyl trimethoxysilane | 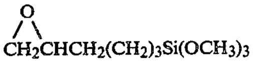 |
| Mercapto | γ-mercaptopropyl trimethoxysilane | $HSCH_2CH_2CH_2Si(OCH_3)_3$ |
| Methyl | Methyl trichlorosilane | $CH_3SiCl_3$ |
| | Dimethyl dichlorosilane | $(CH_3)_2SiCl_2$ |
| | Trimethyl chlorosilane | $(CH_3)_3SiCl$ |
| | Methyl trimethoxysilane | $CH_3Si(OCH_3)_3$ |
| | Methyl triethoxysilane | $CH_3Si(OC_2H_5)_3$ |
| | Hexamethyl disilane | $(CH_3)_3SiNHSi(CH_3)_3$ |
| Chloro | γ-chloropropyl trimethoxysilane | $ClCH_2CH_2CH_2Si(OCH_3)_3$ |
| | γ-chloropropylmethyl dimethoxysilane | $CH_3$<br>\|<br>$ClCH_2CH_2CH_2Si(OCH_3)_2$ |
| Phenyl | Phenyl trimethoxysilane | 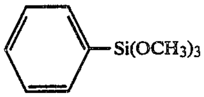 |
| | Phenyl triethoxysilane | 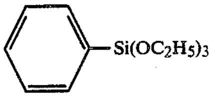 |

TABLE 2

| Chemical Name | Structural Formula |
|---|---|
| γ-aminopropyl trimethoxysilane | $NH_2CH_2CH_2CH_2Si(OCH_3)_3$ |
| γ-aminopropyl triethoxysilane | $NH_2CH_2CH_2CH_2Si(OC_2H_5)_3$ |
| N—β(aminoethyl)γ-amino-propyl trimethoxysilane | $NH_2(CH_2)_2NH(CH_2)_3Si(OCH_3)_3$ |
| N—β(aminoethyl)γ-amino-propylmethyl dimethyoxy-silane | $CH_3$<br>\|<br>$NH_2(CH_2)_2NH(CH_2)_3Si(OCH_3)_2$ |
| N—(dimethoxymethylsilyl-isobutyl)ethyleneamine | $NH_2(CH_2)_2NHCH_2CH(CH_3)CH_2—Si(OCH_3)_2CH_3$ |
| γ-[bis(β-hydroxyethyl)]-aminopropyl triethoxy-silane | $(HOCH_2CH_2)_2N(CH_2)_3Si(OC_2H_5)_3$ |
| γ-ureidopropyl triethoxysilane | $NHCONH(CH_2)_3Si(OC_2H_5)_3$ |
| γ-anilinopropyl trimethoxysilane | 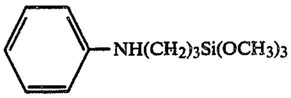 |
| N—[N'—(β''-methoxy-carbonylethyl)-β''-amino-ethyl]-γ-aminopropyl-trimethoxysilane | O<br>‖<br>$CH_3OCCH_2CH_2NH(CH_2)_2═NH(CH_2)_3Si(OCH_3)_3$ |

Subsequently, on the layer 4 is laminated a dry film photoresist 5 (film thickness: about 25 to 100 microns) heated to 80° C. to 105° C. at a speed of 0.5 to 4 feet/-min. under the pressurization conditions of 1 to 3 $kg/cm^2$. During this operation, the dry film photoresist 5 exhibits self-adhesiveness to be fixed through fusion onto the surface of the substrate 1, and it will not be peeled off even when an external force is thereafter applied thereon.

Figure 3:
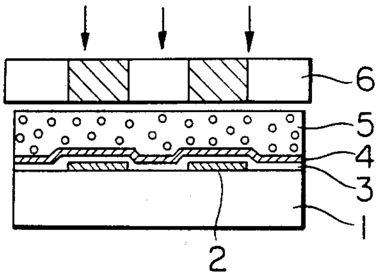

Then, as shown in FIG. 3, after a photomask 6 having a predetermined pattern is superposed on the dry film photoresist provided on the substrate surface, exposure is effected from above the photomask 6. During this operation, it is necessary to have the position at which the ink discharging pressure generating element 2 is to be arranged adapted in correspondence to the position of the above pattern in a conventional manner.

Figure 4:
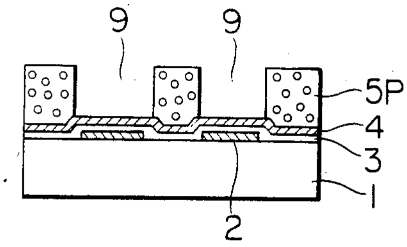

FIG. 4 is a drawing for illustrating the step in which the unexposed portion of the above exposed dry film photoresist 5 is removed by dissolution with a developer comprising a specified organic solvent such as trichloroethane, whereby the ink pathways 9 are formed.

Then, for improvement of ink resistance of the exposed portion 5P of the dry film photoresist remaining on the substrate 1 and completion of the reaction between the dry film photoresist and the silane coupling agent, heat-curing treatment (for example, by heating at 150° to 250° C. for 30 minutes to 6 hours) or ultraviolet-ray irradiation (for example at a UV-ray intensity of 50 to 200 mw/cm$^2$ or higher) is applied thereon. It is also effective to apply both of the above heat curing and curing by ultraviolet-ray.

For the purpose of the invention the photosensitive resin need only be sufficiently hardened or cured to form a stable pathway. In some resins it will be sufficient to partially cure or harden them, while other resins should best be completely cured. If certain sensitive resins are overcured, they may be subject to partial decomposition. Accordingly, it is within the scope of the invention to employ either partially and completely cured resins, whichever are sufficient to form a stable pathway.

After curing and fabrication of the ink pathways the resin may exhibit some residual photosensitivity or none. For some purposes a resin may be selected which retains photosensitivity after at least partial curing or even after complete curing. Such embodiments are all within the scope of the present invention.

Figure 5:
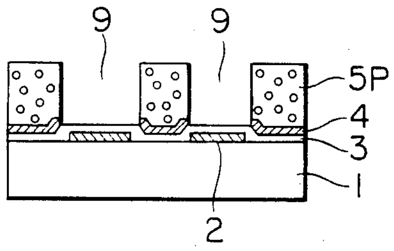

If the silane coupling agent layer 4 employed remains in the grooves 9, it may be dissolved out into the ink to denature the ink or damage the function of the ink discharging energy generating element 2, and therefore it is preferred to remove the silane coupling agent layer 4 exposed within the grooves 9 by washing with oxygen plasma (FIG. 5).

Figure 6:
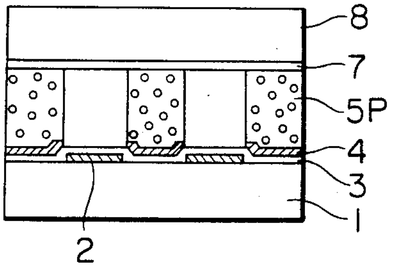

FIG. 6 shows a flat cover plate 8 fixed (e.g., with an adhesive) on the substrate 1 having grooves 9 for ink pathways formed by the above dry film photoresist 5P which in this embodiment had been completely polymerized to be hardened. Without using an adhesive, it may also be fixed under pressurization.

As the specific methods for providing the covering in the step shown in FIG. 6, there are:

(1) the method in which a flat plate 8 such as of glass, ceramic, metal, plastic, etc. is subjected to spinner coating with an epoxy type resin to a thickness of 3 to 4 microns, followed by the so called B-staging of the adhesive 7 by preliminary heating, and then the coated flat plate is laminated on the cured photoresist film 5P, followed by main curing of the aforesaid adhesive; or (2) the method in which a flat plate 8 of a thermoplastic resin such as acrylic resin, ABS resin, polyethylene, etc. is thermally fused directly onto the cured photoresist film 5P.

Figure 7:
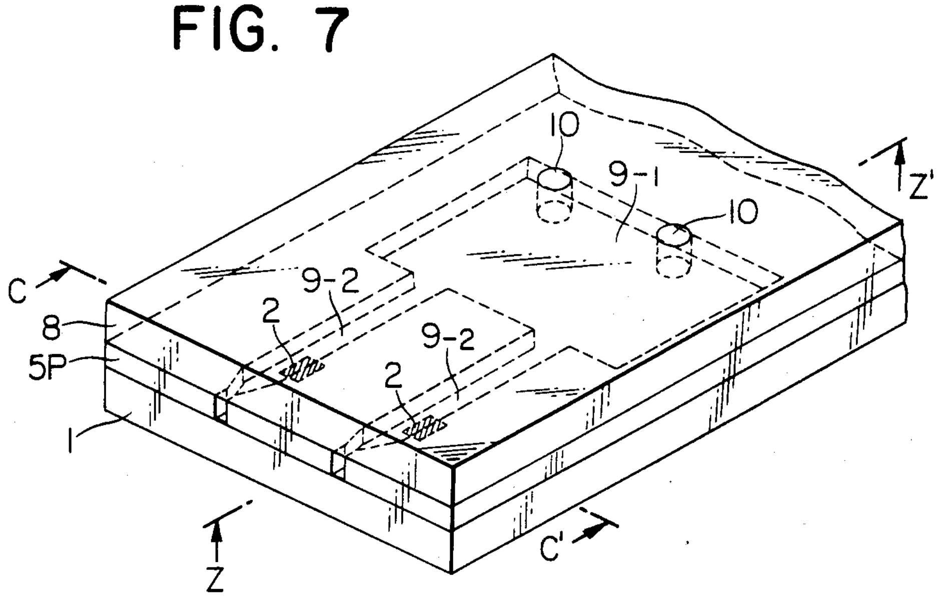
FIG. 7 shows a perspective view of the ink jet head obtained according to the method of the present invention.
Figure 9:
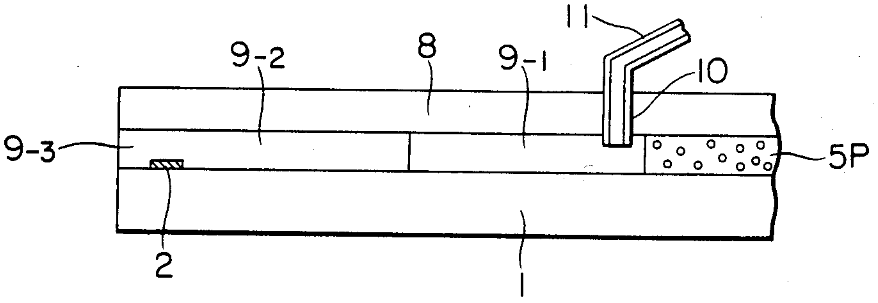

There is shown in FIG. 7 a schematic perspective view of the head appearance after completion of the step shown in FIG. 6. In FIG. 7, 9-1 is an ink supplying chamber, 9-2 narrow ink-flow pathways and 10 thru-holes for connection of the ink supplying tubes (not shown) in the drawing to the ink supplying chamber 9-1.

After completion of the bonding between the substrate having formed grooves and the flat plate as described above, the bonded segment is cut along the line C—C′ shown in FIG. 7. This is done for optimization of the interval between the ink discharging pressure generating element 2 and the ink discharging outlet 9-3 in the narrow ink-flow pathways 9-2, and the region to be cut may be determined suitably as desired. For this cutting, there may be employed the dicing method conventionally used in the semiconductor industry.

Figure 8:
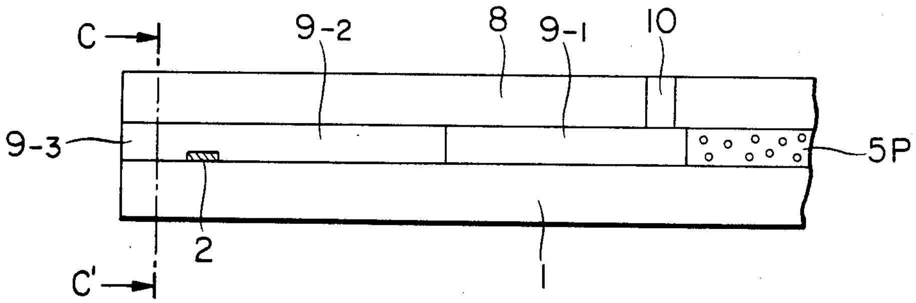
FIGS. 8 and 9 are sectional views taken along the line Z—Z' in FIG. 7.

FIG. 8 is a sectional view taken along the line Z—Z′ in FIG. 7. The cut face is polished to be smooth and the ink supplying tubes 11 are mounted onto the thru-holes 10 to complete the ink jet recording head (FIG. 9).

In the embodiments as shown in the drawings as described above, as the photosensitive composition (photoresist) for preparation of the grooves, there has been employed the dry film type, namely a solid. The present invention is not limited to such solid compositions, however, and liquid photosensitive compositions may also be employed.

As the method for forming the coated film of this photosensitive composition, there may be employed in case of a liquid the squeegee method used in preparation of a relief image, namely the method in which a wall with a height corresponding to the thickness of a desired film thickness of the photosensitive composition is placed around the substrate and the superfluous composition is removed by means of a squeegee. In this case, the photosensitive composition may have a viscosity preferably of 100 cp to 300 cp. The height of the wall to be placed around the substrate is required to be determined by taking the amount to be reduced through vaporization of the solvent component of the photosensitive composition into consideration.

On the other hand, in case of a solid, the photosensitive composition sheet is laminated onto the substrate by pressure contact under heating. In the present invention, it is advantageous to utilize a solid film type from the standpoint of handling as well as easy and precise control of the thickness.

As such solid material sheets, there are photosensitive resin sheets commercially available under the trade names of Permanent Photopolymer Coating RISTON, Solder Mask 730S, 740S, 730FR, 740FR and SM1, produced by the Du Pont Co. and Photec SE-1000, SR-2000 and SR-3000, produced by Hitachi Kasei Co.

In addition, as the photosensitive composition to be used in the present invention, there may also be employed a number of photosensitive compositions employed in the field of photolithography in general such as photosensitive resins, photoresists, etc. These photosensitive compositions may include, for example, diazo resins, p-diazoquinones and further photopolymerizable type photopolymers such as those employing vinyl monomers and polymerization initiators, dimerization type photopolymers employing polyvinyl cinnamate, etc. and sensitizers, mixtures of o-naphthoquinone azide and novolac type phenol resins, mixtures of polyvinyl alcohol and diazo resins, polyether type photopolymers having copolymerized 4-glycidylethyleneoxide with benzophenone or glycidylcalcone, copolymers of N,N-dimethylmethacrylamide with, for example, acrylamide benzophenone, unsaturated polyester type photosensitive resins [e.g. APR (Asahi Kasei), Tevista (Teijin), Sonne (Kansai Paint), etc.], unsaturated urethane oligomer type photosensitive resins, photosensitive compositions comprising mixtures of bi-functional acrylmonomers with photopolymerization initiators and polymers, bichromic acid type photoresist, non-chromium type water soluble photoresist, polycynnamic acid vinyl type photoresist, cyclized rubber-azide type photoresist, etc.

As described in detail above, the present invention has the effects as enumerated below.

1. Due to increased adhesion between the substrate and the photosensitive resin, no peel-off of the photosensitive resin from the substrate occurred even under impact especially by cutting for formation of ink discharging outlets.

2. Through improvement of the solvent resistance at the adhered portion, no peel-off occurred between the pathway walls of a cured photosensitive resin film and the substrate even when employing an ink containing a solvent such as ethylene glycol.

3. Due to high stability in the shape of the ink discharging outlets, the precision of the shot spots of ink with lapse of time is high.

These effects of the present invention are illustrated in detail in the following examples.

EXAMPLES 1–3 AND COMPARATIVE EXAMPLES 1–3

Except for varying the materials of the protective layer surfaces for the respective Examples and practicing or not practicing the treatment with gamma mercaptopropyl trimethoxysilane, following the same steps in the foregoing embodiment (FIGS. 1 through 6), there were prepared a number of samples of ink jet recording heads having 10 ink discharging outlets. Among these sample heads, normal ones free from peel-off between the substrate and the photosensitive resin were tested by immersing in a solution containing 20% water and 80% ethylene glycol at 80° C. for 1000 hours. These results are shown in Table 3.

The ink jet heads obtained in Example 1 and Comparative Example 1 were subjected to the 10 pulse durability letter printing test. As the result, the precision of the shot spot was ±12 microns/2 mm-flight distance for the head of Example 1, while it was ±60 microns/2 mm-flight distance for the head of Comparative Example 1.

The photosensitive resin employed was all RISTON 730S dry film photoresist (trade name; produced by Du Pont Co.).

TABLE 3

| Example No. | Material of protective layer surface | Treatment with silane coupling agent | No. of heads peeled-off: On completion of head | No. of heads peeled-off: After immersion test |
|---|---|---|---|---|
| Example 1 | $SiO_2$ | None | 0/20 | 0/20 |
| Comparative Example 1 | $SiO_2$ | None | 8/20 | 9/20 |
| Example 2 | $Si_3N_4$ | None | 0/20 | 0/20 |
| Comparative Example 2 | $Si_3N_4$ | None | 10/20 | 8/20 |
| Example 3 | $Ti_2O_5$ | None | 0/20 | 0/20 |
| Comparative Example 3 | $Ti_2O_5$ | None | 8/20 | 5/20 |

EXAMPLES 4–6 AND COMPARATIVE EXAMPLES 4–6

Except for varying the materials of the protective layer surfaces for the respective Examples and practicing or not practicing the treatment with isopropyl triisostearoyl titanate (trade name TTS, produced by Ajinomoto, K.K.), following the same steps in the foregoing embodiment (FIGS. 1 through 6), there were prepared a number of samples of ink jet recording heads having 10 ink discharging outlets. Among these sample heads, normal ones free from peel-off between the substrate and the photosensitive resin were tested by immersing in a solution containing 20% water and 80% ethylene glycol at 80° C. for 1000 hours. These results are shown in Table 4.

The ink jet heads obtained in Example 4 and Comparative Example 4 were subjected to the $10^8$ pulse durability letter printing test. As the result, the precision of the shot spot was ±13 microns/2 mm-flight distance for the head of Example 4, while it was ±60 microns/2 mm-flight distance for that of Comparative Example 4.

The photosensitive resin employed was all RISTON 730S dry film photoresist (trade name; produced by Du Pont Co.).

TABLE 4

| Example No. | Material of protective layer surface | Treatment with silane coupling agent | No. of heads peeled-off: On completion of head | No. of heads peeled-off: After immersion test |
|---|---|---|---|---|
| Example 4 | $SiO_2$ | None | 0/20 | 0/20 |
| Comparative Example 4 | $SiO_2$ | None | 9/20 | 9/20 |
| Example 5 | $Si_3N_4$ | None | 0/20 | 0/20 |
| Comparative Example 5 | $Si_3N_4$ | None | 10/20 | 8/20 |
| Example 6 | $Ti_2O_5$ | None | 0/20 | 0/20 |
| Comparative Example 6 | $Ti_2O_5$ | None | 5/20 | 5/20 |

EXAMPLES 7–9

Except for varying the materials of the substrate surfaces for the respective Examples and practicing or not practicing the treatment with gamma mercaptopropyl trimethoxysilane alone in the Comparative examples, and practicing the treatment with a mixed solution of gamma mercaptopropyl trimethoxysilane and n-propylamine or gamma aminopropyl trimethoxysilane in ethanol (each at a concentration of 0.05 mol/liter) in the Examples, following the same steps in the foregoing Examples 1–6, there were prepared a number of samples of ink jet recording heads having 24 ink discharging outlets.

In Comparative Example 9a, and in Examples 9b and 9c, a thin layer of Ta was provided for imparting ink resistance to the substrate surface. Among these sample heads, normal ones free from peel-off between the substrate and the photosensitive resin were tested by immersing in a solution containing 20% water and 80% ethylene glycol at 80° C. for 2500 hours. Also, heat shock test was conducted for the head immersed in the above solution, in which 100 cycles of cooling to −30° C. and heating to 60° C. were repeated. After these tests, an observation was made as to the peeling-off of the photosensitive resin from the substrate. The results are shown in Table 5.

The ink jet heads obtained in Comparative Example 9a and Example 9c were subjected to the $10^8$ pulse durability letter printing test using $10^8$ pulse signals to the energy-generating elements. As a result, the precision of the shot spot was ±11 microns/2 mm-flight distance for the head of Example 9c, while it was ±50 microns/2 mm-flight distance for Comparative Example 9a.

The photosensitive resin employed was all RISTON 730 S dry film photoresist (trade name; produced by the Du Pont Co.).

TABLE 5

| Example No. | Material of Substrate Surface | Silane Coupler | Amine | Number of Peeled Heads: After Immersion Test | Number of Peeled Heads: Heat Shock Method |
|---|---|---|---|---|---|
| Comparative Example 7a | $SiO_2$ | Not used | Not used | * | * |
| Example 7b | $SiO_2$ | Used | Not used | 1/20 | 3/20 |
| Example 7c | $SiO_2$ | Used | n-propylamine | 0/20 | 0/20 |
| Comparative Example 8a | $Ta_2O_5$ | Used | Not used | 3/20 | 8/20 |
| Example 8b | $Ta_2O_5$ | Used | n-propylamine- | 0/20 | 0/20 |
| Example 8c | $Ta_2O_5$ | Used | gamma aminopropyltrimethoxysilane | 0/20 | 0/20 |
| Comparative Example 9a | Ta | Used | Not used | 3/20 | 5/20 |
| Example 9b | Ta | Used | n-propylamine | 0/20 | 0/20 |
| Example 9c | Ta | Used | gamma aminopropyltrimethoxy silane | 0/20 | 0/20 |

*Ratio of peeled heads on completion of heads: 18/20

The results show that where no silane coupler is employed at all, then poor results are obtained. Where a silane coupling agent of the invention is employed in Ex. 7b, 8a and 9a a significant, unexpected improvement in results is obtained. Where a silane coupling reactant and a compound having an amino group is employed as in Ex. 7c, 8b, 8c, 9b and 9c further improved results are obtained.

What is claimed is:

1. In the method for producing an ink jet head by forming walls of an ink flow path of a film of a photosensitive resin on at least one surface of a substance with an ink discharging pressure generating element, a protective layer and an auxiliary layer sequentially interposed therebetween, removing simultaneously with the formation or following formation of the walls, portions of the auxiliary layer existing within the ink flow path and then providing a covering member on the ink flow path, the improvement which comprises;

(a) employing a protective layer of at least one of an inorganic oxide and an inorganic nitride; and (b) employing as the auxiliary layer a silane coupling agent or at least one organometallic compound selected from the group consisting of metal alcoholates, metal carboxylates, and metal chelate compounds.

2. A method for producing an ink jet head according to claim 1 wherein the metals composed of the organometallic compound are selected from the group consisting of aluminum, zirconium, cobalt and titanium.

3. A method for producing an ink jet head according to claim 1 wherein the organometallic compound is isopropyl triisostearoyl titanate.

4. A method for producing an ink jet head according to claim 1 wherein the inorganic oxide is selected from the group consisting of $SiO_2$, $Ta_2O_5$, and glass and the inorganic nitride is selected from the group consisting of $Si_3N_4$ and BN.

5. In the method for producing an ink jet head by forming walls of an ink flow path of a film of a photosensitive resin on at least one surface of a substrate with an ink discharging pressure generating element, a protective layer and an auxiliary layer sequentially interposed therebetween, removing simultaneously with the formation or following formation of the walls, portions of the auxiliary layer existing within the ink flow path and then providing a covering member on the ink flow path, the improvement which comprises:

(a) employing a protective layer of a metal; and (b) employing as the auxiliary layer a silane coupling agent or at least one organometallic compound selected from the group consisting of metal alcoholates, metal carboxylates, and metal chelate compounds.

6. A method for producing an ink jet head according to claim 5 wherein the metals composed of the organometallic compound are selected from the group consisting of aluminum, zirconium, cobalt and titanium.

7. A method for producing an ink jet head according to claim 5 wherein the organometallic compound is isopropyl triisostearoyl titanate.

8. A method for producing an ink jet head according to claim 5 wherein the metal coated on the substrate is selected from the group consisting of Ti, Cr, Ni, Ta, Mo, W, Nb, stainless steel and Monel metal.

9. In the method for producing an ink jet head by forming walls of an ink flow path of a film of a photosensitive resin on at least one surface of a substrate with an ink discharging pressure generating element, a protective layer and an auxiliary layer sequentially interposed therebetween, removing simultaneously with the formation or following formation of the walls, portions of the auxiliary layer existing within the ink flow path and then providing a covering member on the ink flow path, the improvement which comprises:

(a) employing a protective layer of at least one of an inorganic oxide and an inorganic nitride; and (b) employing as the auxiliary layer (1) a silane coupler selected from the group consisting of (i) a silane coupling agent or (ii) a silane coupling reactant combined with a compound having an amino group; or (2) at least one organometallic compound selected from the group consisting of metal alcoholates, metal carboxylates, and metal chelate compounds.

10. A method for producing an ink jet head according to claim 9 wherein the metals composed of the organometallic compound are selected from the group consisting of aluminum, zirconium, cobalt and titanium.

11. A method for producing an ink jet head according to claim 9 wherein the organometallic compound is isopropyl triisostearoyl titanate.

12. A method for producing an ink jet head according to claim 9 wherein the inorganic oxide is selected from the group consisting of $SiO_2$, $Ta_2O_5$, and glass and the inorganic nitride is selected from the group consisting of $Si_3N_4$ and BN.

13. In the method for producing an ink jet head by forming walls of an ink flow path of a film of a photosensitive resin on at least one surface of a substrate with an ink discharging pressure generating element, a protective layer and an auxiliary layer sequentially interposed therebetween, removing simultaneously with the formation or following formation of the walls, portions of the auxiliary layer existing within the ink flow path and then providing a covering member on the ink flow path, the improvement which comprises:

(a) employing a protective layer of a metal; and (b) employing as the auxiliary layer (1) a silane coupler selected from the group consisting of (i) a silane coupling agent or (ii) a silane coupling reactant combined with a compound having an amino group; or (2) at least one organometallic compound selected from the group consisting of metal alcoholates, metal carboxylates, and metal chelate compounds.

14. A method for producing an ink jet head according to claim 13 wherein the metals composed of the organometallic compound are selected from the group consisting of aluminum, zirconium, cobalt and titanium.

15. A method for producing an ink jet head according to claim 13 wherein the organometallic compound is isopropyl triisostearoyl titanate.

16. A method for producing an ink jet head according to claim 13 wherein the metal coated on the substrate is selected from the group consisting of Ti, Cr, Ni, Ta, Mo, W, Nb, stainless steel and Monel metal.

17. In the method for producing an ink jet head by forming walls of an ink flow path of a film of a photosensitive resin on at least one surface of a substrate with an energy generating element for generating energy to be utilized for the discharging of ink, a protective layer and an auxiliary layer sequentially interposed therebetween, removing simultaneously with the formation or following formation of the walls, portions of the auxiliary layer existing within the ink flow path and then providing a covering member on the ink flow path, the improvement which comprises:

(a) employing as the auxiliary layer a silane coupling reactant in combination with a compound having an amino group.

18. A method according to claim 17, wherein said energy generating element is a heat generating element.

19. A method according to claim 17, wherein said energy generating element is a piezoelectric element.

20. A method according to claim 17, wherein the silane coupling layer formed on said treating with said silane coupling reactant has a thickness of 0.3 microns or less.

21. A method according to claim 17, wherein said compound having an amino group is an aliphatic amine.

22. A method according to claim 17, wherein said compound having an amino group is a silane coupling compound having an amino group.

23. In the method of producing an ink jet head by forming walls of an ink flow path of a film of a photosensitive resin on at least one surface of a substrate with an ink discharging pressure generating element, a protective layer and an auxiliary layer sequentially interposed therebetween, optionally removing simultaneously with the formation or following formation of the walls, portions of the auxiliary layer existing within the ink flow path and then providing a covering member on the ink flow path, the improvement which comprises: employing as the auxiliary layer a silane coupling agent or at least one organometallic compound selected from the group consisting of metal alcoholates, metal carboxylates and metal chelate compounds.

24. In the method of producing an ink jet head by forming walls of an ink flow path of a film of a photosensitive resin on at least one surface of a substrate with an ink discharging pressure generating element, a protective layer and an auxiliary layer sequentially interposed therebetween, optionally removing simultaneously with the formation or following formation of the walls, portions of the auxiliary layer existing within the ink flow path and then providing a covering member on the ink flow path, the improvement which comprises;

(a) employing a protective layer of at least one of an inorganic oxide and an inorganic nitride; and (b) employing as the auxiliary layer a silane coupling agent or at least one organometallic compound selected from the group consisting of metal alcoholates, metal carboxylates and metal chelate compounds.

25. In the method for producing an ink jet head by forming walls of an ink flow path of a film of a photosensitive resin on at least one surface of a substrate with an ink discharging pressure generating element, a protective layer and an auxiliary layer sequentially interposed therebetween, optionally removing simultaneously with the formation or following formation of the walls, portions of the auxiliary layer existing within the ink flow path and then providing a covering member on the ink flow path, the improvement which comprises:

(a) employing a protective layer of a metal; and (b) employing as the auxiliary layer a silane coupling agent or at least one organometallic compound selected from the group consisting of metal alcoholates, metal carboxylates, and metal chelate compound.

26. In the method for producing an ink jet head by forming walls of an ink flow path of a film of a photosensitive resin on at least one surface of a substrate with an ink discharging pressure generating element, a protective layer and an auxiliary layer sequentially interposed therebetween, optionally removing simultaneously with the formation or following formation of the walls, portions of the auxiliary layer existing within the ink flow path and then providing a covering member on the ink flow path, the improvement which comprises:

(a) employing a protective layer of at least one of an inorganic oxide and an inorganic nitride; and (b) employing as the auxiliary layer (1) a silane coupler selected from the group consisting (i) a silane coupling agent or (ii) a silane coupling reactant combined with a compound having an amino group; or (2) at least one organometallic compound selected from the group consisting of metal alcohloates, metal carboxylates, and metal chelate compounds.

27. In the method for producing an ink jet head by forming walls of an ink flow path of a film of a photosensitive resin on at least one surface of a substrate with an ink discharging pressure generating element, a protective layer and an auxiliary layer sequentially interposed therebetween, optionally removing simultaneously with the formation or following formation of the walls, portions of the auxiliary layer existing within the ink flow path and then providing a covering member on the ink flow path, the improvement which comprises:

(a) employing a protective layer of a metal; and (b) employing as the auxiliary layer (1) a silane coupler selected from the group consisting of (i) a silane coupling agent or (ii) a silane coupling reactant combined with a compound having an amino group; or (2) at least one organometallic compound selected from the group consisting of metal alcoholates, metal carboxylates, and metal chelate compounds.

28. In the method for producing an ink jet head by forming walls of an ink flow path of a film of a photosensitive resin on at least one surface of a substrate with an energy generating element for generating energy to be utilized for the discharging of ink, a protective layer an an auxiliary layer sequentially interposed therebetween, optionally removing simultaneously with the formation or following formation of the walls, portions of the auxiliary layer existing within the ink flow path and then providing a covering member on the ink flow path, the improvement which comprises:

(a) employing as the auxiliary layer a silane coupling reactant in combination with a compound having an amino group.

* * * * *